(12) United States Patent
Evoy et al.

(10) Patent No.: US 8,533,379 B2
(45) Date of Patent: Sep. 10, 2013

(54) SERIAL COMMUNICATION DEVICE CONFIGURABLE TO OPERATE IN ROOT MODE OR ENDPOINT MODE

(75) Inventors: David Evoy, Chandler, AZ (US); Sam C. Wood, Suwanee, GA (US)

(73) Assignee: NXP B.V., Eindhoven (NL)

( * ) Notice: Subject to any disclaimer, the term of this patent is extended or adjusted under 35 U.S.C. 154(b) by 1542 days.

(21) Appl. No.: 10/583,596

(22) PCT Filed: Dec. 17, 2004

(86) PCT No.: PCT/US2004/042718
§ 371 (c)(1),
(2), (4) Date: Apr. 8, 2011

(87) PCT Pub. No.: WO2005/060688
PCT Pub. Date: Jul. 7, 2005

(65) Prior Publication Data
US 2011/0185103 A1    Jul. 28, 2011

Related U.S. Application Data

(60) Provisional application No. 60/531,301, filed on Dec. 18, 2003.

(51) Int. Cl.
*G06F 13/20* (2006.01)

(52) U.S. Cl.
USPC ............................................. 710/313; 710/52

(58) Field of Classification Search
USPC .................................... 710/305–314, 52, 104
See application file for complete search history.

(56) References Cited

U.S. PATENT DOCUMENTS
2005/0144342 A1* 6/2005 Renaud et al. ................. 710/52

* cited by examiner

*Primary Examiner* — Clifford Knoll

(57) ABSTRACT

Systems and methods according to the present invention provide serial communication devices which are pin-configurable at power on to operate as either a root (20) or endpoint (22) device. In conjunction with, for example, PCI Express specified I/O data buses (24), such devices provide for efficient transfer of serial data between systems and devices.

20 Claims, 4 Drawing Sheets

SERIAL COMMUNICATION DEVICE CONFIGURABLE TO OPERATE IN ROOT MODE OR ENDPOINT MODE

CROSS REFERENCE TO RELATED APPLICATION

This application claims the benefit of U.S. provisional application Ser. No. 60/531,301 filed Dec. 18, 2003, which is incorporated herein whole by reference.

The present invention relates generally to communication devices and, more particularly, to serial communications devices which are configurable to operate as either root devices or endpoint devices.

Technologies associated with the communication and processing of information have evolved rapidly over the last several decades. For example, over the last two decades personal computers (PCs) have transformed the way in which data is communicated and processed for both business and personal applications. A significant component in both PCs and other devices are input/output (I/O) interconnect devices and techniques which are used to transfer data between devices. As the power of microprocessors increases, I/O designers have generated new devices and techniques to avoid bottlenecks being created by the interconnect devices. Thus, various I/O devices and standards have been developed including ISA, EISA and PCI, each having increased data throughput measured in megabytes per second (MB/s). Most recently, an I/O standard referred to as PCI Express has been introduced. Unlike some prior I/O schemes, PCI Express is a serial, point-to-point interface which provides for, among other things, improved scalability relative to legacy I/O schemes.

PCI Express devices and techniques are described in the standards document entitled "PCI Express Base Specification Revision 1.0a" available from the PCI-SIG standards group by writing to: PCI-SIG Administration, 5440 SW Westgate Dr., #217, Portland, Oreg. 97221, the disclosure of which is expressly incorporated here by reference. An exemplary PCI Express topology is shown in FIG. 1. Therein a processor 10 communicates with a root device 12, the root device 12 being defined in PCI Express terminology as the device which interfaces the processor and/or memory device with the rest of the I/O system. The root device 12 can be connected to a variety of other devices including, for example, endpoint devices 14, switches 16 and PCI Express-to-PCI bridges 20. An endpoint device 14 is defined by the PCI Express standard as a device which can request/complete PCI Express transactions. Switches 16 are used to add branches to a PCI Express topology and can interconnect a number of different endpoint devices 18 to the root device 12. The PCI Express-to-PCI bridge 20 provides an interface for legacy PCI devices 22.

The various PCI Express devices seen in FIG. 1 have a number of different capabilities and functionality. For example, certain message types are only valid for transmission by root devices 12 while other message types are only valid for transmission by endpoints 14. An example of this can be found in the power management messages defined in the PCI Express standard wherein only endpoint devices 14 transmit PM_PME messages which inform power management software that an endpoint device is requesting a change in its power management state and, on the other hand, only root devices 12 broadcast a PME_Turn_Off message informing downstream endpoint devices 14 to stop transmission of subsequent PM_PME messages. Numerous other differences exist between PCI express devices.

The differences between PCI Express devices mean that in conventional implementations each device type, e.g., root, endpoint, switch, bridge, etc. is fabricated using its own design and as a different IC chip. Thus root ICs cannot operate as endpoint ICs and vice versa. This, in turn, results in (1) increased development costs for PCI Express devices since the design and fabrication costs associated with the different devices are considerable and (2) inflexibility in the usage of PCI Express devices.

Regarding this latter point, there may exist applications in which it would be desirable to selectively operate a PCI Express device as, for example, either a root device or an endpoint device. For example, consider a digital video chip which was intended for use as either (a) a stand-alone chip with the ability to connect to commodity devices (i.e., the digital video chip operates as a root device with external commodity PCI Express endpoint devices), (2) as part of a PC subsystem that performs video processing as a slave to the host processor (i.e., the digital video chip operates as a PCI express endpoint device) and (3) in combination with a second digital video chip, wherein one operates as a slave and one operates as a master (in which case one of the digital video chips would operate as a root device and the other would operate as an endpoint device). In such applications it would be desirable to flip the operation of the PCI Express device within the chip to operate as either a root device or an endpoint device so that the same PCI Express device can be designed and manufactured for use in the digital video chip regardless of the ultimate application.

Accordingly, it would be desirable to provide techniques and devices which address these challenges.

Systems and methods according to the present invention address this need and others by providing serial communication devices which are pin-configurable at power on to operate as either a root or endpoint device. In conjunction with, for example, PCI Express specified I/O data buses, such devices provide for efficient transfer of serial data between systems and devices.

According to one exemplary embodiment of the present invention, a serial communication device includes means for selectively operating the serial communication device in either a root device mode or an endpoint device mode, means for, when the serial communication device is operating in root device mode, transmitting a first set of messages, and means for, when the serial communication device is operating in the endpoint device mode, transmitting a second set of messages.

According to another exemplary embodiment of the present invention, a serial communication system includes a serial communication bus having at least a first set of traces and a second set of traces, a first serial communication device, fabricated as a first integrated circuit and connected to a first end of the serial communication bus, for transmitting and receiving serial data streams via the first set of traces and the second set of traces, respectively and a second serial communication device, fabricated as a second integrated circuit and connected to a second end of the serial communication bus, for receiving and transmitting serial data streams via the first set of traces and the second set of traces, respectively, wherein the first serial communication device has been pin configured to operate as a root device and the second serial communication device has been pin configured to operate as an endpoint device.

According to a still further exemplary embodiment of the present invention, a method for communicating between serial devices includes the steps of configuring a first serial device to operate in a root operating mode and a second serial device to operate in an endpoint operating mode, transmitting a first set of messages from the first serial device to the second serial device; and transmitting a second set of messages from the second serial device to the first serial device.

The accompanying drawings illustrate exemplary embodiments of the present invention, wherein.

Figure 4A:
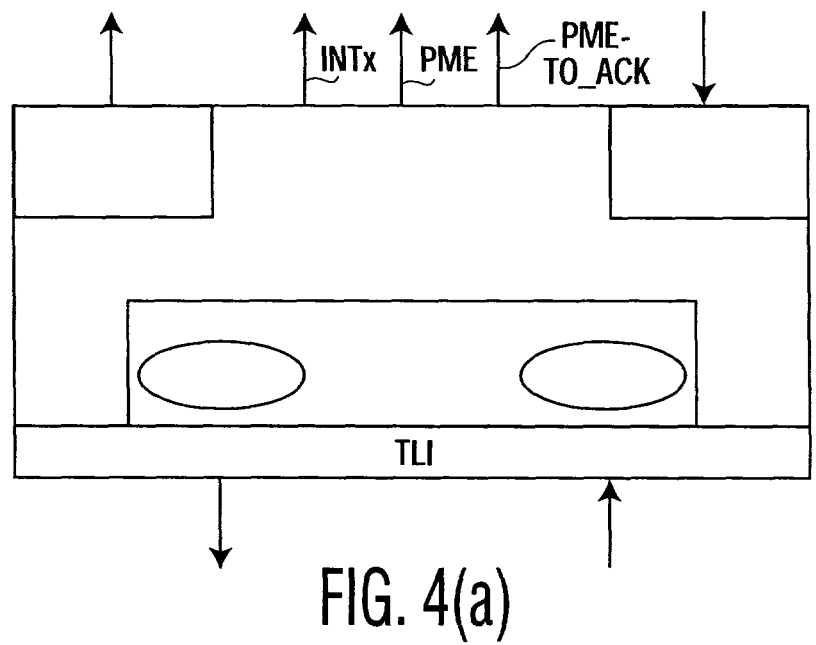
Figure 4B:
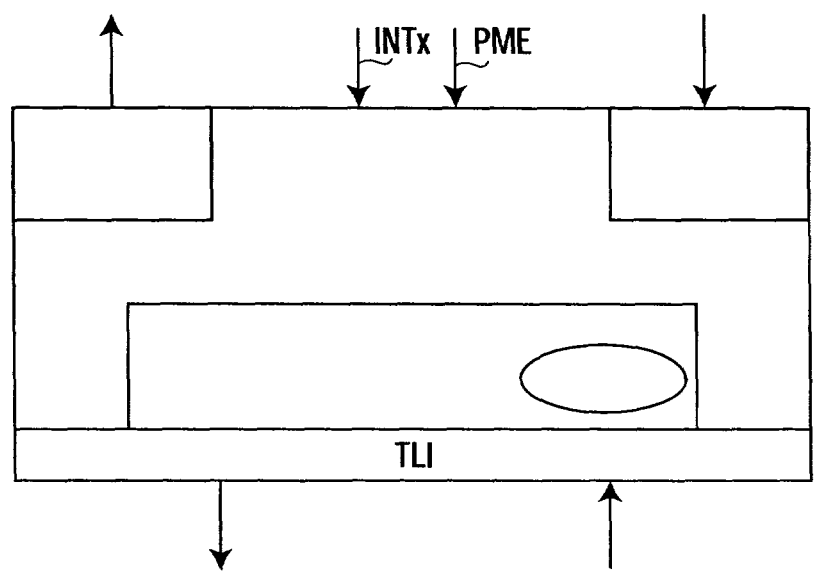
Figure 5:
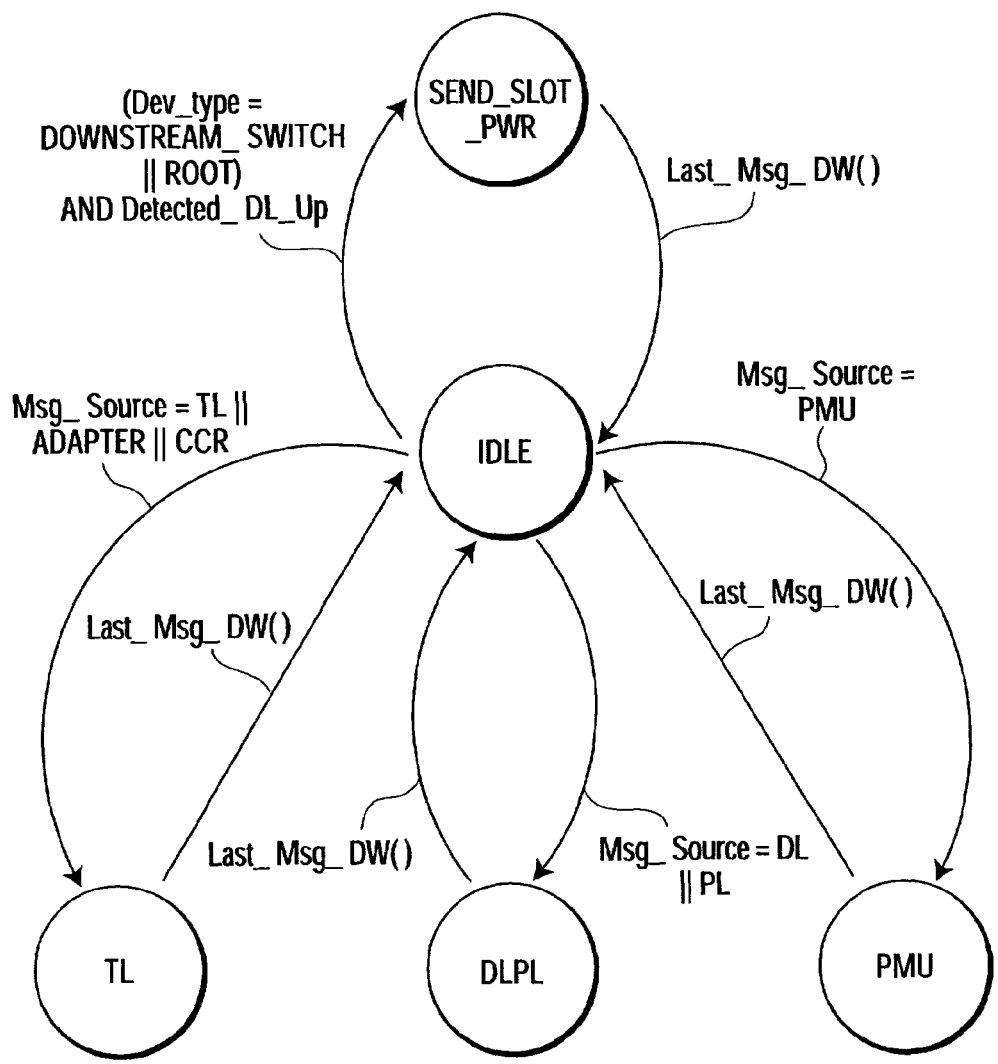

FIGS. 4(a) and 4(b) depict configurable adapter layers of serial communications devices according to exemplary embodiments of the present invention in root device operation mode and endpoint device operation mode according to an exemplary embodiment of the present invention; and FIG. 5 shows an exemplary state machine whose behavior is a function of the operation mode of the serial communication device according to an exemplary embodiment of the present invention.

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
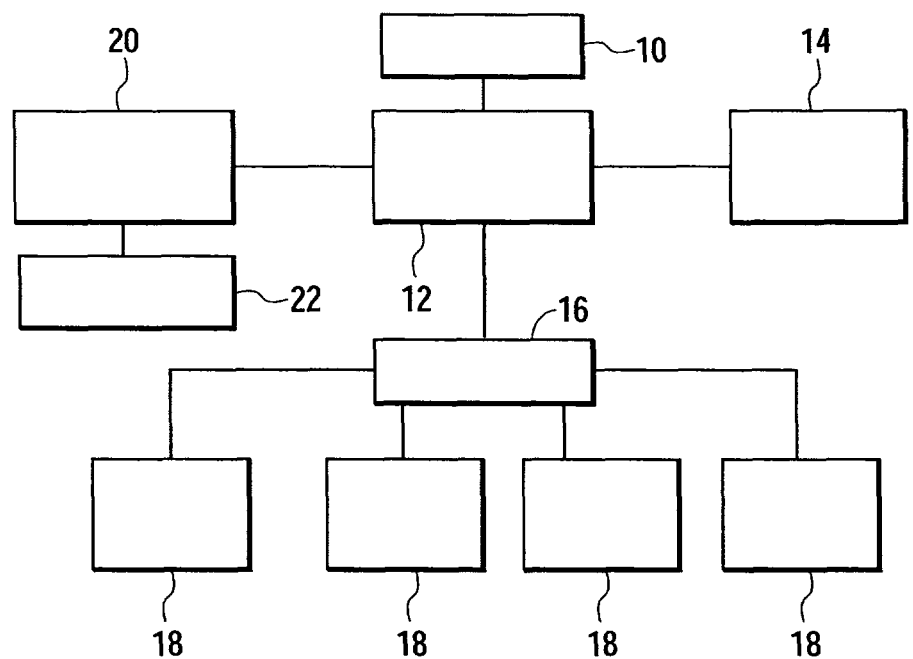
FIG. 1 depicts an exemplary PCI Express topology in which the present invention can be implemented.
Figure 2:
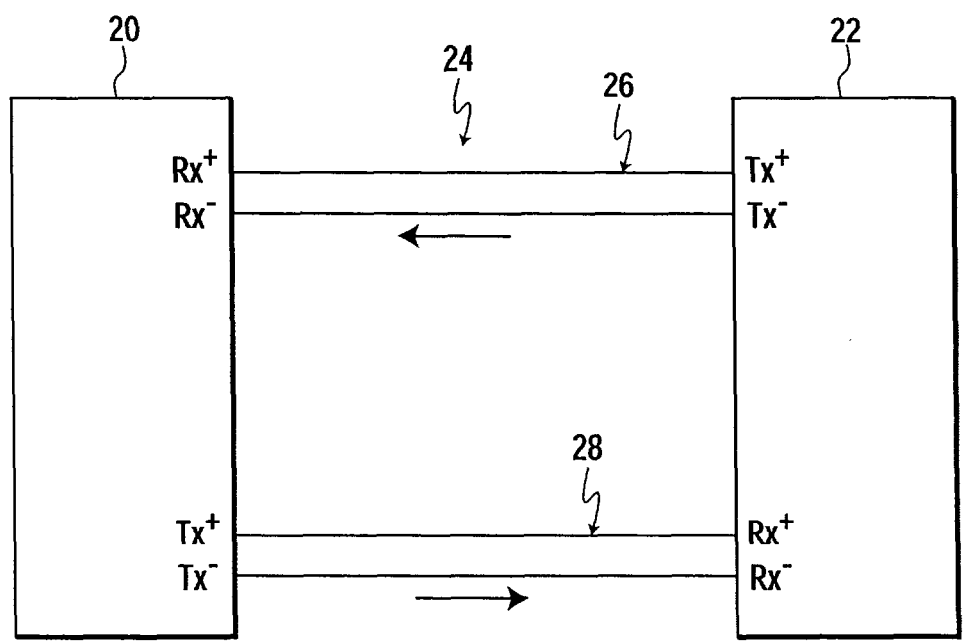
FIG. 2 depicts an exemplary root device and endpoint device interconnected by a serial communication bus which can be used in conjunction with an exemplary embodiment of the present invention.

In order to provide some context for this discussion, an exemplary PCI Express connection will first be described with respect to FIGS. 2 and 3. Therein, a root device 20, e.g., a memory controller device, is connected to an endpoint device 22, e.g., a display controller, via a serial communication bus 24 which operates in accordance with the above-incorporated by reference PCI Express standard. The serial communication bus 24 as shown in FIG. 2 includes two sets of traces 26 and 28. Each set of traces provides for differential, serial communication in one direction. Thus the set of traces 26 provides for the transmission of serial data from the endpoint device 22 to the root device 20, while the set of traces 28 provides for the transmission of serial data from the root device 20 to the endpoint device 22. The two sets of traces 26 and 28 are referred to in PCI Express terminology as one "lane". Serial communication devices according to the present invention may have a serial communication bus 24 having more than one lane, although only one lane is shown in FIG. 2 for simplicity. As will be explained in more detail below, since serial communication devices according to the present invention can operate as either a root device or an endpoint device, root device 20 and endpoint device 22 can have the same architecture and can be identical integrated circuits, albeit one has been pin configured to operate in root device mode and the other has been pin-configured to operate in endpoint device mode.

Figure 3:
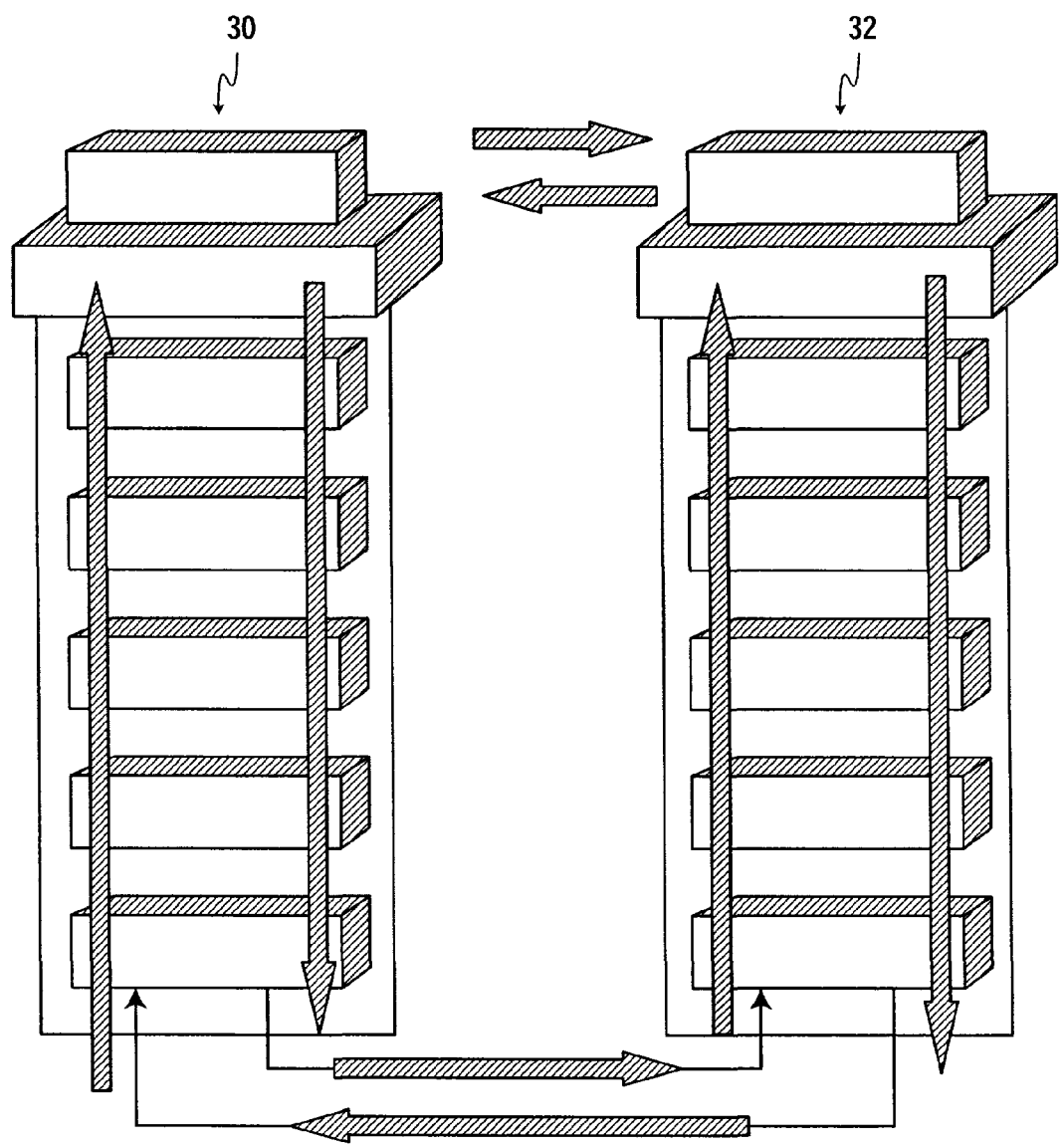
FIG. 3 depicts logical layers of root and endpoint devices.

Serial communication devices which operate in accordance with PCI Express are organized in layers, which layers are illustrated in FIG. 3. Communications between such serial communications devices are defined in the above-incorporated by reference PCI Express Base Specification as one of a number of different transaction types including memory transactions, I/O transactions, configuration transactions and message transactions. Thus, when a root device 30 communicates with an endpoint device 32, the root device 30 sends a transaction down through all of its layers, i.e., the adapter layer, the transaction layer, the data link layer and the physical layer (which includes logical and electrical sublayers). The transaction then flows through the endpoint device 32's layers, beginning with the physical layers and up through the transaction layer and across the adapter layer. This delivers the transaction from the root device 30 to the endpoint device 32. The response to this transaction, or a new transaction initiated at the endpoint device 32 then flows back through all the layers on each side. This delivers transactions from the endpoint device 32 to the root device 30. Of particular significance for exemplary embodiments of the present invention, it should be noted that it is the adapter layer of serial communication devices according to the present invention which operates in different modes depending upon whether the device has been initialized to operate as a root device or an endpoint device.

Some of the functional differences between the operation of a serial communication device according to the present invention in root mode versus the operation of the serial communication device according to the present invention in endpoint mode are apparent from a comparison of FIGS. 4(a) and 4(b). For example, although serial communication devices according to exemplary embodiments of the present invention will include at least two sets of configuration registers (RCRB and Device), the RCRB register set will only be available when the serial communication device is configured to operate in root mode. A complete set of exemplary register definitions for serial communications devices according to the present invention is provided below Also shown in FIGS. 4(a) and 4(b) are certain so-called sideband signaling connections, specifically INTx, PME and PME_TO_Ack. In the legacy PCI schemes these interrupt and power management signals were, in fact, transmitted as sideband signals. However, in the serial PCI Express scheme, such signaling is performed using a message transaction type which was developed to replace sideband signaling in the PCI standard's parallel communication scheme. Of particular interest for this discussion, it should be noted that these (and other) transactions are only valid for either transmission or reception depending upon the operating mode of the device. For example, a serial communication device according to exemplary embodiments of the present invention will transmit interrupt signals (INTx) when operating in endpoint device mode and receive interrupt signals when operating in root device mode. Similarly, certain power management messages (e.g., PME and PME_TO_Ack) are transmitted by serial communication devices according to the present invention when operating in endpoint device mode and received by serial communication devices according to the present invention when operating in root device mode. Other power management messages (e.g., PME_Turn_Off (not shown in FIGS. 4(a) and 4(b))) are transmitted by serial communication devices according to the present invention when operating in root device mode and received by serial communication devices according to the present invention when operating in endpoint device mode. The PME message is used to inform power management software that a particular device is requesting a power management state change. The PME_Turn_Off message is broadcast to devices downstream of, e.g., a root, to stop transmitting subsequent PME messages and the PME_TO_Ack message is an acknowledgement of receipt of a PME_Turn_Off message. In order to operate either as an endpoint device or as a root device, serial communication devices according to the present invention are adapted to handle all of the transactions defined in the PCI Express standards in the manner which is valid for the operating mode of the device. Table 1 identifies those transactions whose handling varies based on operating mode of the device.

TABLE 1

| MESSAGE | DIFFERENCE IN ROOT/ DEVICE ENDPOINT BEHAVIOR |
| --- | --- |
| PME | This message is sent by a Device Endpoint. It is not legal for the root to send this message. This message is received by the root port. |
| PME_Turn_Off | This message is broadcast by a root port and received by a Device Endpoint. |
| PME_TO_Ack | This message is sent by a Device Endpoint. and received by a root port |
| Set_Slot_Power_Limit message | This message is sent by a Device Endpoint. and received by a root port |
| Msg/MsgD broadcast | This message is broadcast by a root port and received by a Device Endpoint.. |

TABLE 1-continued

| MESSAGE | DIFFERENCE IN ROOT/ DEVICE ENDPOINT BEHAVIOR |
| --- | --- |
| ERR_FATAL | These messages are sent by a Device Endpoint. and received by a root port. |
| Unlock | These messages are sent by a Root and received by a Device Endpoint. |

Managing the selected message functionality can be accomplished by, for example, providing HDL (High level Design Language) code to determine whether a serial communication device according to the present invention is permitted to send a message or packet based on its currently programmed device type, e.g., root or endpoint. Exemplary HDL code for accomplishing this feature of the present invention is provided below although those skilled in the art will recognize that other code can be developed to perform this function.

```
function dlpl_send_msg (          Msg : Msg_DL_PL_Tx_rec;
                                  CCR_Read_Group : CCR_Access_rec;
                                  dev_type : STD_LOGIC_VECTOR(3 DOWNTO 0) )
           return boolean is
           variable result  :   boolean;
        begin
           result := FALSE;
           case Msg.err_type is
              when TRAINING_ERR |
                 PROTOCOL_ERR    =>
                   if
       ((CCR_Read_Group.CCR_Capabilities_Group.Device_Control_Group.Fatal_Error_Report_En =
       '1' OR
                     CCR_Read_Group.CCR_Type_Group.Command_Group.SERR_En = '1' ) AND
                   dev_type /= CON_CCR_DEV_TYPE_ROOT AND dev_type /=
CON_CCR_DEV_TYPE_PCI_PCIEXP_BRIDGE) then
                          result := TRUE;              -- Send Message
                   end if;
               when RECEIVER_ERR |
                   BAD_TLP |
                   BAD_DLLP |
                   REPLAY_TIMEOUT |
                   REPLAY_ROLLOVER =>
                      if
       ((CCR_Read_Group.CCR_Capabilities_Group.Device_Control_Group.Correctable_Error_Report_En =
       '1') AND
                         dev_type /= CON_CCR_DEV_TYPE_ROOT AND dev_type /=
CON_CCR_DEV_TYPE_PCI_PCIEXP_BRIDGE) then
                          result := TRUE;              -- ERR_CORR Stuff
                   end if;
               when others          => NULL;
             end case;
             return result;
        end;
```

TABLE 1-continued

| MESSAGE | DIFFERENCE IN ROOT/ DEVICE ENDPOINT BEHAVIOR |
| --- | --- |
| Configuration request are only initiated by the root. | This message is sent by a root and received by a Device Endpoint. |
| Assert_INTA, Assert_INTB, Assert_INTC, Assert_INTD, Deassert_INTA, Deassert_INTB, Deassert_INTC, Deassert_INTD, | These messages are sent by a Device Endpoint. And received by a root port. |
| ERR_COR | These messages are sent by a Device Endpoint. and received by a root port. |
| ERR_NONFATAL | These messages are sent by a Device Endpoint. and received by a root port. |

In addition to the types of messages which are valid for various devices, the message direction, i.e., upstream or downstream, should be considered. For devices which have fixed operating modes, i.e., either root or device endpoint, an upstream direction would always refer to a fixed one of either a TL receiver or a TL transmitter. However in serial devices according to exemplary embodiments of the present invention the meaning of "upstream" and "downstream" will vary depending upon whether the device is configured as a root or an endpoint device. According to exemplary embodiments of the present invention, a dynamic decision regarding whether to send a given packet to the TL receiver or TL transmitter is made based, in part, upon whether the device is configured as a root or an endpoint device. This can be accomplished by, for example, the following multiplexing code.

```
-- ----------------------------------------
-- Direction Select Muxes
-- ----------------------------------------
   MSG_MUX : process ( Pkt_Data_Group, Empty_Pkt_Group, Msg_TLR_Stat_Group,
                       Msg_TLT_Stat_Group, msg_direction_sel, dev_type )
   begin
      Msg_TLR_Data_Group       <= Empty_Pkt_Group;
      Msg_TLT_Data_Group       <= Empty_Pkt_Group;
      Pkt_Stat_Group           <= Msg_TLT_Stat_Group;
      if (Pkt_Data_Group.valid) then
        case dev_type is
          when    CON_CCR_DEV_TYPE_ENDPT |
                  CON_CCR_DEV_TYPE_LEG_ENDPT |
                  CON_CCR_DEV_TYPE_PCIEXP_PCI_BRIDGE |
                  CON_CCR_DEV_TYPE_UPSTRM_SWITCH          => if (msg_direction_sel = UP) then
                                                               Msg_TLR_Data_Group    <= Empty_Pkt_Group;
                                                               Msg_TLT_Data_Group    <= Pkt_Data_Group;
                                                             else
                                                               Msg_TLR_Data_Group    <= Pkt_Data_Group;
                                                               Msg_TLT_Data_Group    <= Empty_Pkt_Group;
                                                             end if;
          when    CON_CCR_DEV_TYPE_DNSTRM_SWITCH          => if (msg_direction_sel = DOWN) then
                                                               Msg_TLR_Data_Group    <= Empty_Pkt_Group;
                                                               Msg_TLT_Data_Group    <= Pkt_Data_Group;
                                                             else
                                                               Msg_TLR_Data_Group    <= Pkt_Data_Group;
                                                               Msg_TLT_Data_Group    <= Empty_Pkt_Group;
                                                             end if;
          when    CON_CCR_DEV_TYPE_ROOT                   => if (msg_direction_sel = DOWN) then
                                                               Msg_TLR_Data_Group    <= Empty_Pkt_Group;
                                                               Msg_TLT_Data_Group    <= Pkt_Data_Group;
                                                             else
                                                               Msg_TLR_Data_Group    <= Empty_Pkt_Group;
                                                               Msg_TLT_Data_Group    <= Empty_Pkt_Group;
                                                             end if;
          when    CON_CCR_DEV_TYPE_PCI_PCIEXP_BRIDGE      => NULL; -- Messages cannot be sent - only set error bits
          when others                                     => NULL;
        end case;
      end if;
   end process MSG_MUX;
```

In order to enable a serial communication device according to the present invention to operate in either a root device mode of operation or an endpoint mode of operation, including the functionality needed to properly handle the above-identified transactions, exemplary embodiments of the present invention include state machines and registers which enable either mode of operation to be activated. In many cases, the state machines described in the above-incorporated by reference PCI Express Base Specification can be used in serial communication devices according to the present invention. However, in certain cases the differences in behavior between root device and endpoint device need to be accommodated. Accordingly, those state machines listed in Table 2 have been identified by Applicant as having different behaviors. Therein, the relevant page(s) from the above-incorporated PCI Express Base Specification which describe the identified root and endpoint state machines are cited for reference by the interested reader.

TABLE 2

Assert_INTx/Deassert_INTx Messages are only issued by endpoint devices. This alters the behavior of the message generation state machines in the transaction layer, see page 63.
If a Downstream Port (root) goes to DL_Down status, the INTx virtual wires associated with Port must be deasserted, and the Upstream Port (device endpoint) virtual wire state updated accordingly. This alters the behavior of the message generation state machines in the transaction layer, see page 66.
Configuration.Linkwidth.Start state is different for root and endpoint, see page 175 and page 176.

TABLE 2-continued

Configuration.Linkwidth.Accept state is different for root and endpoint, see page 178 and page 179.
Configuration.Lanenum.Accept state is different for root and endpoint, see page 180 and page 181.
Configuration.Lanenum.Wait state is different for root and endpoint, see page 181 and page 182.
Configuration.complete state is different for root and endpoint, see page 182 and page 183.
Recovery.idle state behaves differently for root and endpoint, see page 187.
L2.idle state behaves differently for root and endpoint, see page 194.
l2.TransmitWake behaves differently for root and device, see page 195.
Hot Reset state machine behaves differently for root and device, see page 199.
L1 power management state machine behaves differently for root and device, see page 223 and 225.
L2/L3 power management state machine behaves differently for root and device, see page 223 and 225.
D0, D1, D2, and D3hot states behave differently for root and device, see page 230.
The L1 entry state machine behaves differently for root and endpoint, see page 231 and page 250.
The L1 exit state machine behaves differently for root and endpoint, see page 233 and page 250.
The L1 exit state machine behaves differently for root and endpoint, see page 234 and page 250.
PME rules are different for root and endpoint. See page 241 and 242.
ASPM state machine(s) differ for upstream and downstream behavior, see page 243.
Exit from L0s is different for root and device, see page 246.

Having identified those state machines which have disparate behavior as between root and endpoint devices, the next step is to provide serial communication devices according to the present invention with the capability to implement either behavior depending upon the selected operating mode. There are at least two general ways in which this can be accomplished. First, for those state machines identified in Table 2, both the root device state machine and the endpoint device state machine can be independently implemented in the serial communication device and the appropriate set of state machines can be activated when the power-on pin selection is made. Alternatively, for those state machines identified in Table 2, a hybrid state machine can be implemented which uses, as a variable, the operating mode of the device such that state transitions are governed, in part, based on whether the serial communication device is operating in root device mode or endpoint device mode. An example of this latter embodiment is provided as FIG. 5. Therein, a state machine is illustrated which operates to arbitrate and control the transmission of messages from four internal sources referred to in the state diagram as DL, TL, PMU and Slot Power Messages. The state SEND_SLOT_PWR is not required for device endpoints but can, however, be included in a state machine which can be incorporated into serial communications devices according to the present invention and is reached only when the serial communication device is configured to operate as a certain type of device, e.g., downstream switch or root.

In addition to the transactions and state machines, some registers need to be modified relative to the PCI Express Base Specification in order to enable serial communication devices according to exemplary embodiments of the present invention to operate in either root device mode or endpoint device mode. A listing of those registers is provided below. Note that registers found in the above-incorporated by reference PCI Express Base Specification which are not described below can be implemented unchanged in serial communication devices according to the present invention. The following register description is organized into two parts. The first part is a register list that, in the rightmost column (Ref.), provides a numerical reference to the following specifications: (1) PCI Express Base Specification Revision 1.0, (2) PCI-X 2.0 Protocol Specification, (3) PCI Local Bus Specification Revision 2.3, (4) PCI-to-PCI Bridge Architecture 1.1 and (5) PCI Bus Power Management Interface Specification Rev 1.1 each of these specifications are also available from the PCI-SIG standards group by writing to: PCI-SIG Administration, 5440 SW Westgate Dr., #217, Portland, Oreg. 97221, the disclosures of which are expressly incorporated here by reference. The interested reader can find more information regarding those registers in the referenced specification. Reference number 6 refers to additional information which is found in the second part of the register description in this document. Therein, software functionality associated with those registers, and particularly the different functionalities when operating in root device mode as compared with endpoint device mode, is described. Additionally, it should be noted that although the following exemplary register definitions provide significant detail regarding an exemplary implementation of serial communication devices according to the present invention, these exemplary register definitions are purely illustrative and other register definitions can be used to fabricate devices according to the present invention.

| Address | Offset | Register | Description | Root | Endpoint | Ref. |
|---|---|---|---|---|---|---|
| | | | Type 0/1 Configuration Registers | | | |
| 0x00 | 0x00 | VID | Vendor ID | X | X | 3, 6 |
| 0x02 | 0x02 | DID | Device ID | X | X | 3, 6 |
| 0x04 | 0x04 | CMD | Command Register | X | X | |
| 0x06 | 0x06 | STS | Status Register | X | X | |
| 0x08 | 0x08 | RID | Revision ID | X | X | 3 |
| 0x09 | 0x09 | CC | Class Code | X | X | 3 |
| 0x0C | 0x0C | CLS | Cache Line | X | X | 1 |
| 0x0D | 0x0D | MLT | Master Latency Timer | X | X | 1 |
| 0x0E | 0x0E | HT | Header Type | X | X | 3 |
| 0x0F | 0x0F | BIST | Built-In Self Test | X | X | 3 |
| 0x10 | 0x10 | BAR0 | Base Address Register 0, fixed 0 | X | | 4 |
| | 0x10 | BAR0 | Base Address Register 0, customer defined constant | | X | 4 |
| 0x14 | 0x14 | BAR1 | Base Address Register 1, fixed 0 | X | | 4 |
| | 0x14 | BAR1 | Base Address Register 1, customer defined constant | | X | 4 |
| 0x18 | 0x18 | Pri-Bus# | Primary Bus Number, RW, default 0 | X | | 4 |
| | 0x18 | BAR 2 | Base Address Register, Customer to define. | | X | 3 |
| 0x19 | 0x19 | Sec-Bus# | Secondary Bus Number, RW, default 0 | X | | 4 |
| | 0x19 | | Reserved, all zeros | | X | 1 |
| 0x1A | 0x1A | Sub-Bus# | Subordinate Bus Number, RW, default 0 | X | | 4 |
| | 0x1A | | Reserved, all zeros | | X | 1 |
| 0x1B | 0x1B | Sec-LT | Secondary Latency Timer, Reserved, all zeros | X | | 4 |
| | 0x1B | | Reserved, all zeros | | X | 1 |
| 0x1C | 0x1C | I/O Base | I/O Base, software allocation only | X | | 4 |
| | 0x1C | | Reserved, all zeros | | X | 1 |
| 0x1D | 0x1D | I/O Limit | I/O Limit, software allocation only | X | | 4 |
| | 0x1D | | Reserved, all zeros | | X | 1 |
| 0x1E | 0x1E | Sec-STS | Secondary bus status | X | | 4 |
| | 0x1E | | Reserved, all zeros | | X | 1 |
| 0x20 | 0x20 | MEM Base | Memory Base, RW, used by switch | X | | 4 |
| | 0x20 | | Reserved, all zeros | | X | 1 |
| 0x22 | 0x22 | MEM Limit | Memory Limit, RW, used by switch | X | | 4 |
| | 0x22 | | Reserved, all zeros | | X | 1 |
| 0x24 | 0x24 | PMEM Base | Prefetchable Memory, fixed all zeros | X | | 4 |
| | 0x24 | | Reserved, all zeros | | X | 1 |
| 0x26 | 0x26 | PMEM Limit | Prefetchable Memory Limit, fixed all zeros | X | | 4 |
| | 0x26 | | Reserved, all zeros | | X | 1 |

-continued

| Address | Offset | Register | Description | Root | End-point | Ref. |
|---|---|---|---|---|---|---|
| 0x28 | 0x28 | PMEM Base | Prefetchable Memory Base (upper 32-bits), fixed 0 | X | | 4 |
| | 0x28 | CIS | Card Information Struct, not used, fixed 0 | | X | 3, 6 |
| 0x2C | 0x2C | PMEM Limit | Prefetchable Memory Limit (upper 32-bits) | X | | 4 |
| | 0x2C | SVID, SID | Subsystem Vendor ID, Subsystem ID. | | X | 3, 6 |
| | 0x2E | | | | | |
| 0x30 | 0x30 | I/O Base, I/O Limit | I/O Base (upper 16 bits), I/O Limit (upper 16 bits) RW, used in a switch | X | | 4 |
| | 0x30 | ROM BAR | ROM base address. Not used. | | X | 3, 6 |
| 0x34 | 0x34 | CAP PTR | Capabilities Pointer | X | X | 1 |
| 0x35 | 0x35 | | Reserved, all zeros | X | X | 1 |
| 0x37 | 0x37 | | | | | |
| 0x38 | 0x38 | ROM BAR | Expansion ROM base address, Reserved, all zeros | X | | 1 |
| | 0x38 | | Reserved, all zeros | | X | 1 |
| 0x3C | 0x3C | INT LINE | Interrupt Line | X | X | 1 |
| 0x3D | 0x3D | INT PIN | Interrupt Pin | X | X | 1 |
| 0x3E | 0x3E | BCR | Bridge Control Register | X | | 4 |
| 0x3E | 0x3E | MIN GNT | Min Grant, not used. | | X | 1 |
| 0x3F | 0x3F | MAX LAT | Max Latency, not used | | X | 1 |
| | | | MSI | | | |
| 0x40 | 0x00 | Message Control | | | | 3 |
| 0x44 | 0x04 | Message Address | | | | 3 |
| 0x48 | 0x08 | Message Upper Address | Message Upper Address | | | 3 |
| 0x4C | 0x0C | Message Data | Message Data | | | 3 |
| | | | PCI Express Capabilities | | | |
| 0x50 | 0x0 | PCI Express Capability List Register | PCI Express Capability List Register | X | X | 1 |
| 0x52 | 0x2 | PCI Express Capabilities Register | PCI Express Capabilities Register | X | X | 1 |
| 0x54 | 0x4 | Device Capabilities Register | Device Capabilities Register | X | X | 1 |
| 0x58 | 0x8 | Device Control Register | Device Control Register | X | X | 1 |
| 0x5A | 0xA | Device Status Registers | Device Status Registers | X | X | 1 |
| 0x50C | 0x0C | Link Capabilities | Link Capabilities | X | X | 1 |
| 0x60 | 0x10 | Link Control Register | Link Control Register | X | X | 1 |
| 0x62 | 0x12 | Link Status Register | Link Status Register | X | X | 1 |
| 0x64 | 0x14 | Slot Capabilities | Slot Capabilities | X | X | 1 |
| 0x68 | 0x18 | Slot Control | Slot Control | X | X | 1 |
| 0x6A | 0x1A | Slot Status | Slot Status | X | X | 1 |
| 0x6C | 0x1C | Root Control | Root control | X | | 1 |
| | 0x1C | Na | Reserved, all zeros | | X | 1 |
| 0x70 | 0x20 | Root Status | Root status | X | | 1 |
| | 0x20 | Na | Reserved, all zeros | | X | 1 |
| | | | Power | | | |
| 0x74 | 0x0 | Power Management Capability | | X | X | 1, 5 |
| 0x78 | 0x4 | Power Management Status/Control | | X | X | 1, 5 |

The second part of the exemplary register description, according to the present invention, follows. In this section, note the descriptions of root mode and device mode operation.

| Offset | Bit | Reg. | Field | Type | Default | Definition |
|---|---|---|---|---|---|---|
| 0x00 | 15-0 | VID | Vendor ID | RO | tbd | Vendor ID. This field identifies the manufacturer of the device. Valid vendor identifiers are allocated by the PCI SIG to ensure uniqueness. |
| 0x02 | 15:0 | DID | Device ID | RO | tbd | Device ID. This field identifies the particular device. This identifier is allocated by the vendor. |
| | 15-6 | DID | | RO | | Bits 15-6 are set by bits 15-6 of the customer specified Device ID. |
| | 5-0 | DID_wires | | RO | | Driven by external wires Dev ID[5:0] |

-continued

| Offset | Bit | Reg. | Field | Type | Default | Definition |
|---|---|---|---|---|---|---|
| 0x04 | | CMD | Command Register | RW | | This register provides coarse control over a device's ability to generate and respond to PCI cycles. When a 0 is written to this register, the device is logically disconnected from the PCI bus for all accesses except configuration accesses. |
| | 15-11 | | Reserved | RO | 0 | |
| | 10 | | Interrupt Disable | RW | 0 | Interrupt Disable - Controls the ability of a PCI Express device to generate INTx interrupt messages. When set, devices are prevented from generating INTx interrupt messages. Any INTx emulation interrupts already asserted must be deasserted when this bit is set. Default value of this field is 0.<br>Device mode - Adapter will send de-assert messages for all interrupts already asserted<br>Root mode - Adapter gates off interrupts external to the message decode. |
| | 9 | | Fast back-to-back enable | RO | 0 | Fast Back-to-Back Transactions Enable Does not apply to PCI Express. Must be hardwired to 0. |
| | 8 | | SERR Enable | RW | 0 | SERR Enable See Section 7.5.1.7. of PCI Express specification. This bit, when set, enables reporting of non-fatal and fatal errors to the Root Complex. Note that errors are reported if enabled either through this bit or through the PCI-Express specific bits in the Device Control Register<br>Root mode - This is the legacy method to gate the "signal_system_error_out" signal. In root mode using legacy software this is the final gate that controls the assertion of the signal system error line.<br>Device mode - enables error packets Enables the device to send error packets. |
| | 7 | | IDSEL Stepping | RO | 0 | IDSEL Stepping/Wait Cycle Control. Does not apply to PCI Express. Can be hardwired to 0. |
| | 6 | | Parity Error Enable | RW | 0 | Enables PERR generation when set. Device adapter used this bit to gate the Master Data Parity Error Bit, (Config regs offset 0x6, bit 8). Device does not generate parity. |
| | 5 | | VGA Palette Snoop | RO | 0 | VGA Palette Snoop. Does not apply to PCI Express. Can be hardwired to 0. |
| | 4 | | Memory Write and Invalidate | RO | 0 | Memory Write and Invalidate. Does not apply to PCI Express. Can be hardwired to 0. |
| | 3 | | Special Cycle Enable | RO | 0 | Special Cycle Enable. Does not apply to PCI Express. Can be hardwired to 0. |
| | 2 | | Bus Master Enable | RW | 0 | Bus Master Enable Controls the ability of a PCI Express agent to issue memory and I/O read/write requests. Default value of this field is 0. |
| | 1 | | Memory Space Enable | RW | 0 | This bit controls a device's response to Memory Space accesses. |
| | 0 | | I/O Space Enable | RW | 0 | This bit controls a device's response to I/O Space accesses. |

-continued

| Offset | Bit | Reg. | Field | Type | Default | Definition |
|---|---|---|---|---|---|---|
| 0x06 | | STS | Status Register | RO or RW1C | | This register provides status information for PCI bus related events. |
| | 15 | | Detected Parity Error | RW1C | 0 | Detected Parity Error. |
| | 14 | | Signalled System Error | RW1C | 0 | Signalled System Error. This bit is set when a device sends an ERR_FATAL or ERR_NONFATAL message, and the SERR Enable bit in the Command Register is '1'. Set when an error message is sent, always in host direction. Default value of this field is 0. Device Mode Bit is set when a ERR_FATAL or ERR_NONFATAL message is sent. Root Mode Bit is set when a ERR_FATAL or ERR_NONFATAL message is received or one of the enabled internal sources of Fatal and Non Fatal Errors is detected in the core. |
| | 13 | | Received Master Abort | RW1C | 0 | Received Master Abort. This bit is set when a Requestor (Primary Side for Type 1 Header Configuration Space Header device for requests initiated by the Type 1 Header device itself) receives a Completion with Unsupported Request Completion Status. |
| | 12 | | Received Target Abort | RW1C | 0 | Received Target Abort. This bit is set when a Requestor (Primary Side for Type 1 Configuration Space Header device for requests initiated by the Type 1 Header device itself) receives a Completion with Completer Abort Completion Status. Set only when a transaction initiated by this port receives a Completer Abort Status. Device core does not initiate transactions, however, the attached adapter does and this register reports the errors in both cases. |
| | 11 | | Signalled Target Abort | RW1C | 0 | Signalled Target Abort. This bit is set when a device (Primary Side for Type 1 Configuration Space Header device for requests completed by the Type 1 Header device itself) completes a Request using Completer Abort Completion Status. Default value of this field is 0. |
| | 10-9 | | DEVSEL Timing | RO | 0 | DEVSEL Timing Does not apply to PCI Express. Can be hardwired to 0. |
| | 8 | | Master Data Parity Error | RW1C | 0 | Device Mode - Master Data Parity Error This bit is set by Requestor (Primary Side for Type 1 Configuration Space Header Device) if its Parity Error Enable bit is set and either of the following two conditions occurs: Requestor receives a Completion marked poisoned Requestor poisons a write Request If the Parity Error Enable bit is cleared, this bit is never set. Default value of this field is 0. Root Mode - this bit is a fixed 0. |
| | 7 | | Fast back-to-back | RO | 0 | Fast Back-to-Back Transactions Capable Does not apply to PCI Express. Can be hardwired to 0. |
| | 6 | | Reserved | RO | 0 | |
| | 5 | | 66 Mhz Capable | RO | 0 | 66 MHz Capable Does not apply to PCI Express. Can be hardwired to 0. |
| | 4 | | Capabilities List | RO | 1 | Capabilities List. Indicates the presence of an extended capability list item. Since all PCI Express devices are required to implement the PCI Express capability structure, this bit can be set to 1. |

-continued

| Offset | Bit | Reg. | Field | Type | Default | Definition |
|---|---|---|---|---|---|---|
| | 3 | | Interrupt Status | RO | 0 | Interrupt Status. Indicates that an INTx interrupt message is pending internally to the device. This bit requires a side band signal from the adapter, interrupt_status Default value of this field is 0. |
| | 2-0 | | Reserved | RO | 0 | |
| 0x08 | 7-0 | RID | Revision ID | RO | 0x1 | This register specifies a device specific revision identifier. The value is chosen by the vendor. Zero is an acceptable value. This field should be viewed as a vendor defined extension to the Device ID. |
| 0x09 | 23-0 | CC | Class Code | RO | tbd | The Class Code register is read-only and is used to identify the generic function of the device and, in some cases, a specific register-level programming interface. |
| 0x0C | 7-0 | CLS | Cache Line | RW | 0 | A read write field that has no impact on PCI Express device functionality |
| 0x0D | 7-0 | MLT | Master Latency Timer | RO | 0 | Does not apply to PCI Express and must be hard wired to 0 |
| 0x0E | 7-0 | HT | Header Type | RO | 0x00 for end point, 0x01 for others | This byte identifies the layout of the second part of the predefined header (beginning at byte 10h in Configuration Space) and also whether or not the device contains multiple functions. |
| 0x0F | 7-0 | BIST | Built-In Self Test | RO | 0 | This field is a read only 0 in exemplary devices. This optional register is used for control and status of BIST. Devices that do not support BIST must always return a value of 0 (i.e., treat it as a reserved register). A device whose BIST is invoked must not prevent normal operation of the PCI bus. |
| | 7 | | BIST capable | RO | 0 | Return 1 if device supports BIST. Return 0 if the device is not BIST capable. |
| | 6 | | Start BIST | RO | | Write a 1 to invoke BIST. Device resets the bit when BIST is complete. Software should fail the device if BIST is not complete after 2 seconds. |
| | 5-4 | | Reserved | RO | | Reserved. Device returns 0. |
| | 3-0 | | Completion Code | RO | | Value of 0 means the device has passed its test. Non-zero values mean the device failed. Device-specific failure codes can be encoded in the non-zero value. |
| 0x10 | 31-0 | BAR0 | Base Address Register 0 | RW | | Root Mode Fixed 0. This registers allocates space for internal resources not used by device cores, a fixed 0 declares 0 space required. Device Mode Customer defines type and number of read only bits, (size of window), upper bits are RW. |
| 0x14 | 31-0 | BAR 1 | Base Address Register 1 | RW | | Root Mode Fixed 0. This registers allocates space for internal resources not used by device cores, a fixed 0 declares 0 space required. Device Mode Customer defines type and number of read only bits, (size of window), upper bits are RW. |
| 0x18 | 31-0 | BAR 2 | Base Address Register 1 | RW | | Root Mode This 32 bit register is replaced by the 4 eight bit registers Pri_Bus#, Sec_Bus#, Sub-Bus#, and Sec_LT, defined in the next four rows. Device Mode Customer defines type and number of read only bits, (size of window), upper bits are RW. |
| 0x18 | 7-0 | Pri-Bus# | Primary Bus Number | RW | 0 | Device Mode This register is not available, it is BAR2 above. Root Mode The Primary Bus Number register is used to record the bus number of the PCI bus segment to which the primary interface of the bridge is connected. Configuration software programs the value in this register. The bridge uses this register to decode Type |

| Offset | Bit | Reg. | Field | Type | Default | Definition |
|---|---|---|---|---|---|---|
| | | | | | | 1 configuration transactions on the secondary interface that must be converted to Special Cycle transactions on the primary interface. |
| 0x19 | 7-0 | Sec-Bus# | Secondary Bus Number | RW | 0 | Device Mode Customer defined constant, see definition of BAR2 above. Root Mode The Secondary Bus Number register is used to record the bus number of the PCI bus segment to which the secondary interface of the bridge is connected. Configuration software programs the value in this register. The bridge uses this register to determine when to respond to a Type 1 configuration transaction on the primary interface and convert it to a Type 0 transaction on the secondary interface. |
| 0x1A | 7-0 | Sub-Bus# | Subordinate Bus Number | RW | 0 | Device Mode Customer defined constant, see definition of BAR2 above. Root Mode The Subordinate Bus Number register is used to record the bus number of the highest numbered PCI bus segment which is behind (or subordinate to) the bridge. Configuration software programs the value in this register. The bridge uses this register in conjunction with the Secondary Bus Number register to determine when to respond to a Type 1 configuration transaction on the primary interface and to pass it to the secondary interface. |
| 0x1B | 7-0 | Sec-LT | Secondary Latency Timer | RO | 0 | Device Mode Customer defined constant, see definition of BAR2 above. Root Mode This register does not apply to PCI Express. It is hardwired to 0 in exemplary devices. |
| 0x1C | | I/O Base | I/O Base | RW | 0 | Device Mode Reserved, all zeros, (register becomes a read only with default of 0) Root Mode Base address of forwarding range for I/O transactions |
| | 7-4 | | | RW | | Address 15:12 of the IO base address. Used along with IO_LIMIT to determine when to forward I/O transactions from one interface to the other. This field is ignored by exemplary cores but can be made available for external decode in a switch/router application. |
| | 3-2 | | Reserved | RO | | Reserved. Device returns 0. |
| | 1-0 | | | RO | | 00 = 16 bit IO addressing, 01 = 32 bit IO addressing, 02-03 are reserved. Exemplary devices support 32 bit IO addressing and hardwires this field to 01. |
| 0x1D | | I/O Limit | I/O Limit | RW | 0 | Device Mode Reserved, all zeros, (register becomes a read only with default of 0) Root Mode Limit of forwarding range for I/O transactions |
| | 7-4 | | | RW | | Address 15:12 of the IO limit address. Used along with IO_BASE to determine when to forward I/O transactions from one interface to the other. This field is ignored by the exemplary cores but can be made available for external decode in a switch/router application. |
| | 3-2 | | Reserved | RO | | Reserved. Device returns 0. |
| | 1-0 | | | RO | | 00 = 16 bit IO addressing, 01 = 32 bit IO addressing, 02-03 are reserved. Exemplary devices support 32 bit IO addressing and hardwires this field to 01. |

-continued

| Offset | Bit | Reg. | Field | Type | Default | Definition |
|---|---|---|---|---|---|---|
| 0x1E | | Sec-STS | | RW1C | 0 | Device Mode Reserved, all zeros, (register becomes a read only with default of 0)<br>Root Mode See definition in next 11 rows |
| | 15 | | | RW1C | 0 | Detected Parity Error.<br>Root Mode This bit is set by the Secondary Side for a Type 1 Configuration Space Header device whenever it receives a poisoned regardless of the state the Parity Error Response bit. Once set, this bit remains set until it is reset by writing a 1 to this bit location.<br>Device Mode Not used, fixed zero |
| | 14 | | | RW1C | 0 | Received System Error.<br>This bit is set when a device sends a ERR_FATAL or ERR_NONFATAL message, and the SERR Enable bit in the Bridge Control Register is 1b. Once set, this bit remains set until it is reset by writing a 1 to this bit location.<br>Device Mode Not used, fixed zero<br>Root Mode Bit is set when a ERR_FATAL or ERR_NONFATAL message is received. |
| | 13 | | | RO | 0 | Received Master Abort. This bit is set when the Secondary Side for Type 1 Configuration Space Header device (for requests initiated by the Type 1 Header device itself) receives a Completion with Unsupported Request Completion Status. Default value of this field is 0. Once set, this bit remains set until it is reset by writing a 1 to this bit location.<br>Device Mode Not used, fixed zero<br>Root Mode Not used, fixed zero. The secondary side does not initiate requests by itself. |
| | 12 | | | RO | 0 | Received Target Abort See Section 7.5.1.7. This bit is set when the Secondary Side for Type 1 Configuration Space Header device (for requests initiated by the Type 1 Header device itself) receives a Completion with Completer Abort Status. Default value of this field is 0. Once set, this bit remains set until it is reset by writing a 1 to this bit location.<br>Device Mode Not used, fixed zero<br>Root Mode Not used, fixed zero. The secondary side does not initiate requests by itself. |
| | 11 | | | RO | 0 | Signalled Target Abort. This bit is set when the Secondary Side for Type 1 Configuration Space Header device (for requests completed by the Type 1 Header device itself) completes a Request using Completer Abort Completion Status. Once set, this bit remains set until it is reset by writing a 1 to this bit location.<br>Device Mode Not used, fixed zero<br>Root Mode Not used, fixed zero. The secondary side does not initiate requests by itself. |
| | 10-9 | | | RO | | DEVSEL Timing. Does not apply to PCI Express. Can be hardwired to 0. |
| | 8 | | | RW1C | 0 | Master Data Parity Error.<br>Root Mode This bit is set by the Secondary side Requestor if the Parity Error Response bit is set and either of the following two conditions occurs: The Requestor receives Completion marked poisoned or the Requestor poisons a write Request If the Parity Error Response bit is cleared, this bit is never set. Default value of this field is 0. This |

| Offset | Bit | Reg. | Field | Type | Default | Definition |
|---|---|---|---|---|---|---|
| | 7 | | | RO | | bit remains set until it is reset by writing a 1 to this bit location. Device Mode Not used, fixed zero Fast Back-to-Back Transactions Capable Does not apply to PCI Express. Can be hardwired to 0. |
| | 6 | | | | | Reserved. Device returns 0. |
| | 5 | | | RO | 0 | 66 MHz Capable This bit indicates whether or not the secondary interface of the bridge is capable of operating at 66 MHz. This bit is hardwired to a 0 in exemplary devices. |
| | 4-0 | | | | | Reserved. Device returns 0. |
| 0x20 | | MEM Base | Memory Base | RW | 0 | Device Mode Reserved, all zeros, (register becomes a read only with default of 0) Root Mode Base address of forwarding range for memory transactions. See definition in next 2 rows |
| | 15-4 | | | RW | | This Memory Base Register, along with the Memory Limit Register, defines a region that is used by the bridge to determine when to forward memory transactions from one interface to the other. These bits correspond to address 31:20. This field is ignored by the exemplary cores but can be made available for external decode in a switch/router application. |
| | 3-0 | | | | | Reserved. Device returns 0. |
| 0x22 | 15-0 | MEM Limit | Memory Limit | RW | 0 | Device Mode Reserved, all zeros, (register becomes a read only with default of 0) Root Mode Limit of forwarding range for memory transactions. See definition in next 2 rows |
| | 15-4 | | | RW | 12 | This Memory Limit Register, along with the Memory Base Register, defines a region that is used by the bridge to determine when to forward memory transactions from one interface to the other. These bits correspond to address 31:20. This field is ignored by the exemplary cores but can be made available for external decode in a switch/router application. |
| | 3-0 | | | | | Reserved. Device returns 0. |
| 0x24 | 15-0 | PMEM Base | Prefetchable Memory | RO | 0 | Device Mode Reserved, all zeros Root Mode Base address of forwarding range for prefetchable memory transactions. Prefetchable space is not used by exemplary devices. These bits are fixed 0s. |
| 0x26 | 15-0 | PMEM Limit | Prefetchable Memory Limit | RO | 0 | Device Mode Reserved, all zeros Root Mode Limit of forwarding range for prefetchable memory transactions. Prefetchable space is not used by exemplary devices. These bits are fixed 0s. |
| 0x28 | 31-0 | PMEM Base | Prefetchable Memory Base (upper 32-bits) | RO | 0 | Device Mode CIS, Card Information Struct, not used, fixes 0 in exemplary devices. Root Mode Base address of forwarding range for 64-bit prefetchable memory transactions. This register is a fixed 0 in exemplary devices. |
| 0x2C | 15-0 | SVID | Sub system Vendor ID | RO | HDLI (0x1131) | Root mode - This register is replace by the PMEM Limit register below. Device Mode - This register along with SID is used to uniquely identify the add-in card or subsystem where the PCI device resides. They provide a mechanism for add-in card vendors to distinguish their add-in cards from one another even though the add-in cards may have the same PCI controller on them (and, therefore, the same Vendor ID and Device ID). |

-continued

| Offset | Bit | Reg. | Field | Type | Default | Definition |
|---|---|---|---|---|---|---|
| 0x2E | 15-0 | SID | Sub system ID | RO | | Root mode - This register is replace by the PMEM Limit register below. Device Mode - This register along with SVID is used to uniquely identify the add-in card or sub system where the PCI device resides. They provide a mechanism for add-in card vendors to distinguish their add-in cards from one another even though the add-in cards may have the same PCI controller on them (and, therefore, the same Vendor ID and Device ID). Next two lines describe the source of the individual bits in this register. |
| | 15-3 | | | RO | 0x0 (HDLI) | Bits 15-3 are set by bits 15-3 of the customer specified SubSystem ID. |
| | 2-0 | | | RO | | Driven by external wires SubSys[2:0] |
| 0x2C | 31-0 | PMEM Limit | Prefetchable Memory Limit (upper 32) | RO | 0 | Device mode - This register replace by the two registers above, SVID and SID. Root Mode - Limit of forwarding range for 64-bit prefetchable memory transactions. This register is a fixed 0 in exemplary devices. |
| 0x30 | 31-0 | ROM BAR | Expansion ROM base address | RO | 0 | Root mode - This register is replace by the I/O Base and I/O Limit registers below. Device Mode - ROM base address. Exemplary devices hardwire this field to 0. |
| 0x30 | 15-0 | I/O Base | I/O Base (upper 16 bits) | RO | 0 | Device Mode - This register is replace by the ROM BAR register above. Root mode - Base address of forwarding range for 32-bit I/O transactions. |
| 0x32 | 15-0 | I/O Limit | I/O Limit (upper 16 bits) | RO | 0 | Device Mode - This register is replace by the ROM BAR register above. Root mode - Base address of forwarding range for 32-bit I/O transactions |
| 0x34 | 7-0 | CAP PTR | Capabilities Pointer | RO | 0x40 | This optional register is used to point to a linked list of new capabilities implemented by this device. This register is only valid if the "Capabilities List" bit in the Status Register is set. If implemented, the bottom two bits are reserved and should be set to 00b. Software should mask these bits off before using this register as a pointer in Configuration Space to the first entry of a linked list of new capabilities. |
| 0x350 x37 | all | | Reserved | RO | 0 | |
| 0x38 | 31-0 | ROM BAR | Expansion ROM base address | RW | 0 | Device mode - Reserved, all zeros, (register becomes a read only with default of 0) Root mode - Controls expansion ROM mapping. This register always returns all zeros in an exemplary core. |
| 0x3C | 7-0 | INT LINE | Interrupt Line | RW | 0 | A read write field that is used by device drivers and the O.S., not directly used by PCI Express devices |
| 0x3D | 7-0 | INT PIN | Interrupt Pin | RO | 0x1 | The Interrupt Pin is a read-only register that identifies the legacy interrupt message(s) the device (or device function) uses. Valid values are 1, 2, 3, and 4 that map to legacy interrupt messages for INTA, INTB, INTC, and INTD respectively; a value of 0 indicates that the device uses no legacy interrupt message(s). |
| 0x3E | 7-0 | MIN GNT | Minimum Grant | RO | 0 | Root Mode - See Bridge Control Register below Device Mode - This register does not apply to PCI Express and can be hard wired to 0. |
| 0x3F | 7-0 | MAX LAT | Maximum Latency | RO | 0 | This register does not apply to PCI Express and cant be hard wired to 0. |

-continued

| Offset | Bit | Reg. | Field | Type | Default | Definition |
|---|---|---|---|---|---|---|
| 0x3E | 15-0 | BCR | Bridge Control Register | RW | 0 | Device Mode - This register is a read only all zero register that can be formed by write protecting the Bridge Control Register to form the MINGNT and MAX LAT fields for Device Type 0 access. Root mode - Bridge Control Register. Individual register bits in following rows |
| | 15-12 | RSVD | Reserved | RO | 0 | Reserved |
| | 11 | | Discard Timer SERR Enable | RO | 0 | Discard Timer SERR Enable. Does not apply to PCI Express. Can be hardwired to 0. |
| | 10 | | Discard Timer Status | RO | 0 | Discard Timer Status. Does not apply to PCI Express. Can be hardwired to 0. |
| | 9 | | Secondary Discard Timer | RO | 0 | Secondary Discard Timer. Does not apply to PCI Express. Can be hardwired to 0. |
| | 8 | | Primary Discard Timer | RO | 0 | Primary Discard Timer. Does not apply to PCI Express. Can be hardwired to 0. |
| | 7 | | Fast Back-to-Back Enable | RO | 0 | Fast Back-to-Back Transactions Enable. Does not apply to PCI Express. Can be hardwired to 0. |
| | 6 | | Secondary Bus | RW | 0 | Secondary Bus Reset. Setting this bit triggers a warm reset on the corresponding PCI Express Port and the PCI Express hierarchy domain subordinate to the Port. Default value of this field is 0. |
| | 5 | | Master Abort Md | RO | 0 | Master Abort Mode. Does not apply to PCI Express. Can be hardwired to 0. |
| | 4 | RSVD | Reserved | RO | 0 | Reserved |
| | 3 | | VGA Enable | RO | 0 | Not supported by exemplary devices. Can be hardwired to 0. |
| | 2 | | ISA Enable | RO | 0 | Not supported by exemplary devices. Can be hardwired to 0. |
| | 1 | | SERR Enable | RW | 0 | SERR Enable. This bit, when set, enables reporting of non-fatal and fatal errors to the Root Complex. Note that errors are reported if enabled either through this bit or through the PCI-Express specific bits in the Device Control Register. Default value of this field is 0. Device Mode - Not used. Root mode - When set to a 0, received error messages cannot set the Signalled System Error bit in the Status Register. When set to a 1, received error messages can set the Signalled System Error bit in the Status Registers. The Received System Error bit in the Secondary Status Register is not affected by this bit. |
| | 0 | | Parity Error Response Enable | RW | 0 | Parity Error Response Enable. This bit controls the response to poisoned TLPs. Default value of this field is 0. |

PCI Express Capabilities Registers

| Offset | Bit | Reg. | Field | type | default | Definition |
|---|---|---|---|---|---|---|
| 0x0 | | PCI Express Capability List | | RO | | The PCI Express Capability List register enumerates the PCI Express Capability Structure in the PCI 2.3 configuration space capability list. |
| | 15-8 | | Next Capability Pointer | RO | 0x74 | The offset to the next PCI capability structure or 00h if no other items exist in the linked list of capabilities |
| | 7-0 | | Capability ID | RO | 0x10 | Indicates PCI Express Capability Structure. This field returns a Capability ID of 10h indicating that this is a PCI Express Capability Structure |

-continued

| | | | PCI Express Capabilities Registers | | | |
|---|---|---|---|---|---|---|
| Offset | Bit | Reg. | Field | type | default | Definition |
| 0x2 | | PCI Express Capabilities | | | 1 | |
| | 15:14 | | | | | Reserved |
| | 13-9 | | Interrupt Message Number | RO | 0 | If this function is allocated more than one MSI interrupt number, this register is required to contain the offset between the base Message Data and the MSI Message that is generated when any of status bits in either the Slot Status register or the Root Port Status register of this capability structure are set. Hardware is required to update this field so that it is correct if the number of MSI Messages assigned to the device changes. |
| | 8 | | Slot Implemented | RO | 0 | This bit when set indicates that the PCI Express Link associated with this port is connected to a slot (as compared to being connected to an integrated component or being disabled). This field is valid for the following PCI Express device/Port Types: Root Port of PCI Express Root Complex downstream Port of PCI Express Switch JetStream does not include support for slots, this field is a fixed 0 in all JetStream cores. REVIEWERS NOTE - JetStream used here, replaced in other places |
| | 7-4 | | Device/ Port Type | RO | 1 | Supported in the Exemplary Core 0001b Legacy PCI Express Endpoint device 0100b Root Port of PCI Express Root Complex* Reserved by PCI Express but not supported 0000b PCI Express Endpoint device 0110b downstream Port of PCI Express Switch* 0111b PCI Express-to-PCI/PCI-X Bridge* 1000b PCI/PCI-X to PCI Express Bridge* 0101b upstream Port of PCI Express Switch* |
| | 3-0 | | Capability Version | RO | 01 | Indicates PCI-SIG defined PCI Express capability structure version number. Must be 1h for this specification. |
| 0x4 | | Device Capabilities Register | | | | |
| | 31-28 | | | | | Reserved |
| | 27-26 | | Captured Slot Power Limit Scale | RO | 0 | (upstream Ports only) Specifies the scale used for the Slot Power Limit Value. Range of Values: 00b = 1.0x 01b = 0.1x 10b = 0.01x 11b = 0.001x This value is set by the Set_Slot_Power_Limit message or hardwired to 00b (see Section 6.9). The default value is all 00b. Exemplary ores hardwire this field to 0, but other alternative defaults can be selected. |
| | 25-18 | | Captured Slot Power Limit Value | RO | 0 | (upstream Ports only) In combination with the Slot Power Limit Scale value, specifies the upper limit on power supplied by slot. Power limit (in Watts) calculated by multiplying the value in this field by the value in the Slot Power Limit Scale field. This value is set by the Set_Slot_Power_Limit message or hardwired to 0000 0000b. The default value is 0000 0000b. Exemplary cores hardwire this field to 0, but other alternative defaults can be selected. |
| | | | | RO | 0 | |

PCI Express Capabilities Registers

| Offset | Bit | Reg. | Field | type | default | Definition |
|---|---|---|---|---|---|---|
| | 14 | | Power Indicator Present | RO | 0 | This bit, when set, indicates that a Power Indicator is implemented on the card or module. This bit is valid for the following PCI Express device Types:<br>PCI Express Endpoint device<br>Legacy PCI Express Endpoint device<br>upstream Port of PCI Express Switch<br>PCI Express-to-PCI/PCI-X bridge Exemplary cores hardwire this field to 0. |
| | 13 | | Attention Indicator Present | RO | 0 | Attention Indicator Present. This bit, when set, indicates that an Attention Indicator is implemented on the card or module. This bit is valid for the following PCI Express device Types:<br>PCI Express Endpoint device<br>Legacy PCI Express Endpoint device<br>upstream Port of PCI Express Switch<br>PCI Express-to-PCI/PCI-X bridge Exemplary cores hardwire this field to 0. |
| | 12 | | Attention Button Present | RO | 0 | This bit when set indicates that an Attention Button is implemented on the card or module. This bit is valid for the following PCI Express device Types:<br>PCI Express Endpoint device<br>Legacy PCI Express Endpoint device<br>upstream Port of PCI Express Switch<br>PCI Express-to-PCI/PCI-X bridge Exemplary cores always hardwire this field to 0. |
| | 11-9 | | | RO | 000 | Endpoint L1 Acceptable Latency. This field indicates the acceptable latency that an Endpoint can withstand due to the transition from L1 state to the L0 state. It is essentially an indirect measure of the Endpoint's internal buffering. Power management software uses the reported L1 Acceptable Latency number to compare against the L1 Exit Latencies reported (see below) by all components comprising the data path from this Endpoint to the Root Complex Root Port to determine whether Active State Link PM L1 entry can be used with no loss of performance. Defined encodings are:<br>000b Less than 1 μs<br>001b 1 μs to less than 2 μs<br>010b 2 μs to less than 4 μs<br>011b 4 μs to less than 8 μs<br>100b 8 μs to less than 16 μs<br>101b 16 μs to less than 32 μs<br>110b 32 μs-64 μs<br>111b More than 64 μs |
| | 8-6 | | | RO | 010 | Endpoint L0s Acceptable Latency This field indicates the acceptable total latency that an Endpoint can withstand due to the transition from L0s state to the L0 state. It is essentially an indirect measure of the Endpoint's internal buffering. Power management software uses the reported L0s Acceptable Latency number to compare against the L0s exit latencies reported by all components comprising the data path from this Endpoint to the Root Complex Root Port to determine whether Active State Link PM L0s entry can be used with no loss of performance. Defined encodings are:<br>000b Less than 64 ns<br>001b 64 ns to less than 128 ns<br>010b 128 ns to less than 256 ns<br>011b 256 ns to less than 512 ns<br>100b 512 ns to less than 1 μs<br>101b 1 μs to less than 2 μs<br>110b 2 μs-4 μs<br>111b More than 4 μs |

PCI Express Capabilities Registers

| Offset | Bit | Reg. | Field | type | default | Definition |
|---|---|---|---|---|---|---|
| | 5 | | | RO | 0 | Extended Tag Field Supported. This field indicates the maximum supported size of the Tag field. Defined encodings are:<br>0b 5-bit Tag field supported<br>1b 8-bit Tag field supported<br>Note that 8-bit Tag field support must be enabled by the corresponding control field in the Device Control register. Exemplary cores always hardwire this field to 0. |
| | 4-3 | | Phantom Functions Supported | RO | 0 | This field indicates the support for use of unclaimed function numbers to extend the number of outstanding transactions allowed by logically combining unclaimed function numbers (called Phantom Functions) with the Tag identifier. |
| | 2-0 | | Max_Payload_Size Supported | RO | 0 | This field indicates the maximum payload size that the device can support for TLPs. Defined encodings are:<br>000b 128B max payload size<br>001b 256B max payload size<br>010b 512B max payload size<br>011b 1024B max payload size<br>100b 2048B max payload size<br>101b 4096B max payload size<br>110b Reserved<br>111b Reserved<br>Exemplary cores hardwire this field to 0 |
| 0x8 | | Device Control Register | | | | |
| | 15 | | | RO | 0 | Reserved |
| | 14-12 | | Max_Read_Request_Size | RO | 0 | This field sets the maximum Read Request size for the Device as a Requester. The Device must not generate read requests with size exceeding the set value. Defined encodings for this field are: 000b 128B max read request size<br>001b 256B max read request size<br>010b 512B max read request size<br>011b 1024B max read request size<br>100b 2048B max read request size<br>101b 4096B max read request size<br>110b Reserved<br>111b Reserved<br>Devices that do not generate Read Request larger 128B are permitted to implement this field as Read Only (RO) with a value of 000b. Default value of this field is 000b. |
| | 11 | | Enable No Snoop | RO | 1 | (Endpoint device only, exemplary device upstream and downstream ports hardwire this to 1) If this bit is set to 1, the device is permitted to set the No Snoop bit in the Requester Attributes of transactions it initiates that do not require hardware enforced cache coherency. |
| | 10 | | Auxiliary (AUX) Power PM Enable | RO | 0 | This bit when set enables a device to draw AUX power independent of PME AUX power. Exemplary devices hardwire this to 0. |
| | 9 | | Phantom Functions Enable | RO | 0 | When set, this bit enables a device to use unclaimed functions as Phantom Functions to extend the number of outstanding transaction identifiers. If the bit is cleared, the device is not allowed to use Phantom Functions. Default value of this field is 0. For exemplary that do not implement this capability hardwire this bit to 0. |
| | 8 | | Extended Tag Field Enable | RO | 0 | When set, this bit enables a device to use an 8-bit Tag field as a requester. If the bit is cleared, the device is restricted to a 5-bit Tag field. Default value of this field is 0. For devices that do not implement this capability hardwire this bit to 0. |

-continued

| | | | PCI Express Capabilities Registers | | | |
|---|---|---|---|---|---|---|
| Offset | Bit | Reg. | Field | type | default | Definition |
| | 7-5 | | Max_Payload_Size | RO | 0 | This field sets maximum TLP payload size for the device. As a receiver, the device must handle TLPs as large as the set value; as transmitter, the device must not generate TLPs exceeding the set value. Permissible values that can be programmed are indicated by the Max_Payload_Size Supported in the Device Capabilities register. Defined encodings for this field are:<br>000b 128B max payload size<br>001b 256B max payload size<br>010b 512B max payload size<br>011b 1024B max payload size<br>100b 2048B max payload size<br>101b 4096B max payload size<br>110b Reserved<br>111b Reserved<br>Default value of this field is 000b.<br>Exemplary devices hardwire this field to 000b. |
| | 4 | | Enable Relaxed Ordering | RW | 1 | (device endpoint only) If this bit is set, the device is permitted to set the Relaxed Ordering bit in the Attributes field of transactions it initiates that do not require strong write ordering. Default value of this bit is 1. This bit may be hardwired to 0 if a device never sets the Relaxed Ordering attribute in transactions it initiates as a requester. |
| | 3 | | Unsupported Request Reporting Enable | RW | 0 | This bit enables reporting of Unsupported Requests when set. For a multi-function device, this bit controls error reporting for each function from point-of-view of the respective function. Note that the reporting of error messages (ERR_COR, ERR_NONFATAL, ERR_FATAL) received by Root Port is controlled exclusively by Root Control Register. Default value of this field is 0.<br>Legacy software not used, see CMD register<br>Device mode This is the PCE Express aware mechanism to enable generation of a Non Fatal ERR message when the adapter signals an Unsupported Request Error.<br>Root Mode not used, see Root Control Register |
| | 2 | | Fatal Error Reporting Enable | RW | 0 | This bit controls reporting of fatal errors. For a multi-function device, this bit controls error reporting for each function from point-of-view of the respective function. For a Root Port, the reporting of fatal errors is internal to the root. No external ERR_FATAL message is generated. Default value of this field is 0.<br>Legacy software not used, see CMD register<br>Device mode This is the PCE Express aware mechanism to enable generation of Fatal ERR messages when the adapter signals a Fatal Error message or the core detects any of several fatal errors internally.<br>Root Mode not used, see Root Control Register |
| | 1 | | Non-Fatal Error Reporting Enable | RW | 0 | This bit controls reporting of non-fatal errors. For a multi-function device, this bit controls error reporting for each function from point-of-view of the respective function. For a Root Port, the reporting of non-fatal errors is internal to the root. No external ERR_NONFATAL message is generated. Default value of this field is 0.<br>Legacy software not used, see CMD register<br>Device mode This is the PCE Express aware mechanism to enable generation of Non Fatal ERR messages when the adapter |

PCI Express Capabilities Registers

| Offset | Bit | Reg. | Field | type | default | Definition |
|---|---|---|---|---|---|---|
| | | | | | | signals a Non Fatal Error message or the core detects any of several non fatal errors internally. Root Mode not used, see Root Control Register |
| | 0 | | Correctable Error Reporting Enable | RW | 0 | This bit controls reporting of correctable, errors. For a multi-function device, this bit controls error reporting for each function from point-of-view of the respective function. For a Root Port, the reporting of correctable errors is internal to the root. No external ERR_COR message is generated. Default value of this field is 0. Legacy software not used Device mode This is the PCI Express aware mechanism to enable generation of Correctable ERR messages when the adapter signals a Correctable Error message or the core detects any of several Correctable errors internally. Root Mode not used, see Root Control Register |
| 0xA | | Device Status Registers | | | | |
| | 15:6 | | | RO | 0 | Reserved |
| | 5 | | Transactions Pending | RO | 0 | This bit when set indicates that a device has issued Non-Posted Requests which have not been completed. A device reports this bit cleared only when all Completions for any outstanding Non-Posted Requests have been received. |
| | 4 | | AUX Power Detected | RO | 0 | Devices that require AUX power report this bit as set if AUX power is detected by the device. |
| | 3 | | Unsupported Request Detected | RW1C | 0 | This bit indicates that the device received an Unsupported Request. |
| | 2 | | Fatal Error Detected | RW1C | 0 | This bit indicates status of fatal errors detected. |
| | 1 | | Non-Fatal Error Detected | RW1C | 0 | This bit indicates status of non-fatal errors detected. |
| | 0 | | Correctable Error Detected | RW1C | 0 | This bit indicates status of correctable errors detected. |
| 0x0C | | Link Capabilities | | | | |
| | 31-24 | | Port Number | RO | 1 | This field indicates the PCI Express port number for the given PCI Express Link. |
| | 23:18 | | | RO | 0 | Reserved |
| | 17-15 | | L1 Exit Latency | RO | HDLI (110) | This field indicates the L1 exit latency for the given PCI Express Link. The value reported indicates the length of time this Port requires to complete transition from L1 to L0. Defined encodings are: 000b Less than 1 μs 001b 1 μs less than 2 μs 010b 2 μs to less than 4 μs 011b 4 μs to less than 8 μs 100b 8 μs to less than 16 μs 101b 16 μs to less than 32 μs 110b 32 μs-64 μs 111b More than 64 μs Note that exit latencies may be influenced by PCI Express reference clock configuration depending upon whether a component uses a common or separate reference clock. |
| | 14-12 | | L0s Exit Latency | RO | HDLI (110) | This field indicates the L0s exit latency for the given PCI Express Link. The value reported indicates the length of time this Port requires to complete transition from L0s to L0. Defined encodings are: 000b Less than 64 ns 001b 64 ns to less than 128 ns |

-continued

| | | | | PCI Express Capabilities Registers | | | |
|---|---|---|---|---|---|---|---|
| Offset | Bit | Reg. | Field | type | default | Definition | |
| | | | | | | 010b 128 ns to less than 256 ns | |
| | | | | | | 011b 256 ns to less than 512 ns | |
| | | | | | | 100b 512 ns to less than 1 μs | |
| | | | | | | 101b 1 μs to less than 2 μs | |
| | | | | | | 110b 2 μs-4 μs | |
| | | | | | | 111b Reserved | |
| | | | | | | Note that exit latencies may be influenced by PCI Express reference clock configuration depending upon whether a component uses a common or separate reference clock. | |
| | 11-10 | | Active State Link PM Support | RO | 11 | This field indicates the level of active state power management supported on the given PCI Express Link. Defined encodings are: 00b Reserved 01b L0s Entry Supported 10b Reserved 11b L0s and L1 Supported | |
| | 9:4 | | Maximum Link Width | RO | HDLI (0x04) | This field indicates the maximum width of the given PCI Express Link. Defined encodings are: 000000b Reserved 000001b x1 000010b x2 000100b x4 001000b x8 001100b x12 010000b x16 100000b x32 | |
| | 3-0 | | Maximum Link Speed | RO | 1 | This field indicates the maximum Link speed of the given PCI Express Link. Defined encodings are: 0001b 2.5 Gb/s Link All other encodings are reserved. | |
| 0x10 | | Link Control Register | | | | The Link Control register controls PCI Express Link specific parameters. | |
| | 15-8 | | | | | Reserved | |
| | 7 | | Extended Synch | RW | 0 | This bit when set forces extended transmission of FTS ordered sets in FTS and extra TS2 at exit from L1 prior to entering L0. | |
| | 6 | | Common Clock Configuration | RW | 0 | This bit when set indicates that this component and the component at the opposite end of this Link are operating with a distributed common reference clock. | |
| | 5 | | Retrain Link | RW | 0 | This bit initiates Link retraining when set; this field is not applicable and reserved for endpoint devices and upstream Ports of a Switch. This bit always returns 0 when read. | |
| | 4 | | Link Disable | RW | 0 | This bit disables the Link when set to 1b; this field is not applicable and reserved for endpoint devices and upstream Ports of a Switch. | |
| | 3 | | Read Completion Boundary (RCB) | Root Ports: RO, other RW | 1 | 0b 64 byte 1b 128 byte This field is hardwired for a Root Port and returns its RCB support capabilities. This field is RW for other ports. Devices that do not implement this feature can hardwire the field to 0b. | |
| | 2 | | | RO | 0 | Reserved | |
| | 1-0 | | ActiveState Link PMControl | RW | 0 | This field controls the level of active state PM supported on the given PCI Express Link. Defined encodings are: 00b Disabled 01b L0s Entry Supported 10b Reserved 11b L0s and L1 Entry Supported | |

| PCI Express Capabilities Registers | | | | | | |
|---|---|---|---|---|---|---|
| Offset | Bit | Reg. | Field | type | default | Definition |
| 0x12 | | Link Status Register | | | | The Link Status register provides information about PCI Express Link specific parameters. |
| | 15-13 | | | | | Reserved |
| | 12 | | Slot Clock Configuration | RO | 0 | This bit indicates that the component uses the same physical reference clock that the platform provides on the connector. If the device uses an independent clock irrespective of the presence of a reference on the connector, this bit must be clear. |
| | 11 | | Link Training | RO | 0 | This read-only bit indicates that Link training is in progress Ports of Switches. |
| | 10 | | Training Error | RO | 0 | This read-only bit indicates that a Link training error occurred. |
| | 9-4 | | Negotiated Link Width | RO | 0 | This field indicates the negotiated width of the given PCI Express Link. Defined encodings are: 000001b X1 000010b X2 000100b X4 001000b X8 001100b X12 010000b X16 100000b X32 All other encodings are reserved. |
| | 3-0 | | Link Speed | RO | 1 | This field indicates the negotiated Link speed of the given PCI Express Link. Defined encodings are: 0001b 2.5 Gb/s PCI Express Link All other encodings are reserved. This field is fixed as 1 in exemplary devices. |
| 0x14 | | Slot Capabilities | | | | The Slot Capabilities register identifies PCI Express slot specific capabilities. |
| | 31:19 | | Physical Slot Number | RO | 0 | This hardware initialized field indicates the physical slot number attached to this Port. |
| | 18:17 | | | RO | 0 | Reserved |
| | 16-15 | | Slot Power Limit Scale | RO | (0) | Specifies the scale used for the Slot Power Limit Value. Range of Values: 00b = 1.0x 01b = 0.1x 10b = 0.01x 11b = 0.001x This register must be implemented if the Slot Implemented bit is set. The default value for exemplary cores is set by a HDLi parameter. |
| | 14-7 | | Slot Power Limit Value | RO | (0x14) | In combination with the Slot Power Limit Scale value, specifies the upper limit on power supplied by slot. Power limit (in Watts) |
| | 6 | | Hot-plug Capable | RO | 0 | This bit when set indicates that this slot is capable of supporting Hot-plug operations. Exemplary devices hardwire this to 0. |
| | 5 | | Hot-plug Surprise | RO | 0 | This bit when set indicates that a device present in this slot might be removed from the system without any prior notification. Exemplary devices hardwire this to 0. |
| | 4 | | Power Indicator Present | RO | 0 | This bit when set indicates that a Power Indicator is implemented on the chassis for this slot. Exemplary devices hardwire this to 0. |
| | 3 | | Attention Indicator Present | RO | 0 | This bit when set indicates that an Attention Indicator is implemented on the chassis for this slot. Exemplary devices hardwire this to 0. |
| | 2 | | MRL Sensor Present | RO | 0 | This bit when set indicates that an MRL Sensor is implemented on the chassis for this slot. Exemplary devices hardwire this to 0. |
| | 1 | | Power Controller Present | RO | 0 | This bit when set indicates that a Power Controller is implemented for this slot. Exemplary devices hardwire this to 0 |
| | 0 | | Attention Button Present | RO | 0 | This bit when set indicates that an Attention Button is implemented on the chassis for this slot. Exemplary devices hardwire this to 0 |

PCI Express Capabilities Registers

| Offset | Bit | Reg. | Field | type | default | Definition |
|---|---|---|---|---|---|---|
| 0x18 | | Slot Control | | | | The Slot Control register controls PCI Express Slot specific parameters. Exemplary devices hardwire this to 0. |
| | 15-11 | | | | | Reserved |
| | 10 | | Power Controller Control | RO | 0 | When read this register returns the current state of the Power applied to the slot; when written sets the power state of the slot per the defined encodings.<br>0b Power On<br>1b Power Off Exemplary devices hardwire this to 0. |
| | 9-8 | | Power Indicator Control | RO | 0 | Reads to this register return the current state of the Power Indicator; writes to this register set the Power Indicator. Defined encodings are:<br>00b Reserved<br>01b On<br>10b Blink<br>11b Off<br>Writes to this register also cause the Port to send the appropriate POWER_INDICATOR_* messages. Exemplary devices hardwire this to 0. |
| | 7-6 | | Attention Indicator Control | RO | 0 | Reads to this register return the current state of the Attention Indicator; writes to this register set the Attention Indicator. Defined encodings are:<br>00b Reserved<br>01b On<br>10b Blink<br>11b Off<br>Writes to this register also cause the Port to send the appropriate ATTENTION_INDICATOR_* messages. Exemplary devices hardwire this to 0. |
| | 5 | | Hot plug Interrupt Enable | RO | 0 | This bit when set enables generation of hot plug interrupt on enabled hot plug events. Default value of this field is 0. Exemplary devices hardwire this to 0. |
| | 4 | | Command Completed Interrupt Enable | RO | 0 | This bit when set enables the generation of hot plug interrupt when a command is completed by the Hot plug controller. Default value of this field is 0. Exemplary devices hardwire this to 0. |
| | 3 | | Presence Detect Changed Enable | RO | 0 | This bit when set enables the generation of hot plug interrupt or wake message on a presence detect changed event. Default value of this field is 0. Exemplary devices hardwire this to 0. |
| | 2 | | MRL Sensor Changed Enable | RO | 0 | This bit when set enables the generation of hot plug interrupt or wake message on a MRL sensor changed event. Default value of this field is 0. Exemplary devices hardwire this to 0. |
| | 1 | | Power Fault Detected Enable | RO | 0 | This bit when set enables the generation of hot plug interrupt or wake message on a power fault event. Default value of this field is 0. Exemplary devices hardwire this to 0. |
| | 0 | | Attention Button Pressed Enable | RO | 0 | This bit when set enables the generation of hot plug interrupt or wake message on an attention button pressed event. Default value of this field is 0. Exemplary devices hardwire this to 0. |
| 0x1A | | Slot Status | | | | The Slot Status register provides information about PCI Express Slot specific parameters. |
| | 15-7 | | | RO | 0 | Reserved |
| | 6 | | | RO | 0 | Presence Detect State. This bit indicates the presence of a card in the slot. |
| | 5 | | MRL Sensor State | RO | 0 | This register reports the status of the MRL sensor if it is implemented. Defined encodings are:<br>0b MRL Closed<br>1b MRL Open<br>Exemplary devices hardwire this to 0. |

-continued

PCI Express Capabilities Registers

| Offset | Bit | Reg. | Field | type | default | Definition |
|---|---|---|---|---|---|---|
| | 4 | | Command Completed | RO | 0 | This bit is set when the hot plug controller completes an issued command. Exemplary devices hardwire this to 0. |
| | 3 | | Presence Detect Changed | RO | 0 | This bit is set when a Presence Detect change is detected. Exemplary devices hardwire this to 0. |
| | 2 | | MRL Sensor Changed | RO | 0 | This bit is set when a MRL Sensor state change is detected. Exemplary devices hardwire this to 0. |
| | 1 | | Power Fault Detected | RO | 0 | This bit is set when the Power Controller detects a power fault at this slot. Exemplary devices hardwire this to 0. |
| | 0 | | Attention Button Pressed | RO | 0 | This bit is set when the attention button is pressed. Exemplary devices hardwire this to 0. |
| 0x1C | | Root Control | | | | The Root Control register controls PCI Express Root Complex specific parameters. This register is only available for Root type endpoints. This is a read only all 0 register in all other endpoints. |
| | 31-4 | | | | | Reserved |
| | 3 | | PME Interrupt Enable | RW | 0 | This bit when set enables interrupt generation upon receipt of a PME message as reflected in the PME Status register bit. |
| | 2 | | System Error on Fatal Error Enable | RW | 0 | If set this bit indicates that a System Error should be generated if a fatal error (ERR_FATAL) is reported by any of the devices in the hierarchy associated with this Root Port, or by the Root Port itself. |
| | 1 | | System Error on Non-Fatal Error Enable | RW | 0 | If set this bit indicates that a System Error should be generated if a non-fatal error (ERR_NONFATAL) is reported by any of the devices in the hierarchy associated with this Root Port, or by the Root Port itself. |
| | 0 | | System Error on Correctable Error Enable | RW | 0 | If set this bit indicates that a System Error should be generated if a correctable error (ERR_COR) is reported by any of the devices in the hierarchy associated with this Root Port, or by the Root Port itself. |
| 0x20 | | Root Status | | | | The Root Status register provides information about PCI Express device specific parameters. This register is only available for Root type endpoints. This is a read only all 0 register in all other endpoints. |
| | 31-18 | | | | | Reserved |
| | 17 | | PME Pending | RO | 0 | This read-only bit indicates that another PME is pending when the PME Status bit is set. When the PME Status bit is cleared by software; the PME is delivered by hardware by setting the PME Status bit again and updating the Requestor ID appropriately. The PME pending bit is cleared by hardware if no more PMEs are pending. |
| | 16 | | PME Status | RW1C | 0 | This bit indicates that PME was asserted by the requestor ID indicated in the PME Requestor ID field. Subsequent PMEs are kept pending until the status register is cleared by software by writing a 1. |
| | 15:0 | | PME Requestor ID | RO | 0 | This field indicates the PCI requestor ID of the last PME requestor. |

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A serial communication system comprising: a serial communication bus (24) having at least a first set of traces (28) and a second set of traces (26); a first serial communication device (20), fabricated as a first integrated circuit and connected to a first end of said serial communication bus (24), for transmitting and receiving serial data streams via said first set of traces (28) and said second set of traces (26), respectively; and a second serial communication device (22), fabricated as a second integrated circuit and connected to a second end of said serial communication bus (24), for receiving and transmitting serial data streams via said first set of traces (28) and said second set of traces (26), respectively, wherein said first serial communication device (20) has been pin configured to operate as a root device and said second serial communication device (22) has been pin configured to operate as an endpoint device.

2. The serial communication system of claim 1, wherein said first and second integrated circuits have identical architectures.

3. The serial communication system of claim 1, wherein both said first and second serial communication devices (20, 22) include at least one state machine having state transitions which occur as a function of said pin configured device type.

4. The serial communication system of claim 3, wherein said at least one state machine includes a SEND_SLOT_PWR state which can be reached by said first serial communication device (20) but not by said second serial communication device (22).

5. The serial communication system of claim 1, wherein said first serial communication device (20) is enabled to transmit a first set of messages and said second serial communication device (22) is enabled to transmit a second set of messages.

6. The serial communication system of claim 5, wherein said first set of messages includes at least one configuration message and said second set of messages includes at least one interrupt message.

7. The serial communication system of claim 5, wherein said second set of messages includes a PME message which requests said first serial communication device (20) to perform a power management state change and wherein said first set of messages includes a PME_Turn_Off message, which message instructs said second serial communication device (22) to stop sending said PME messages.

8. A serial communication device comprising: means for selectively operating said serial communication device (20 or 22) in either a root device mode or an endpoint device mode; means for, when said serial communication device is operating in said root device mode, transmitting a first set of messages; and means for, when said serial communication device is operating in said endpoint device mode, transmitting a second set of messages different than said first set of messages.

9. The serial communication device of claim 8, wherein said means for selectively operating further comprises: a set of bits in a PCI Express capabilities register which are set to a first value when said serial communication device is operating in said root device mode and which are set to a second value when said serial communication device is operating in said endpoint device mode.

10. The serial communication device of claim 9, wherein said set of bits in said PCI Express capabilities register is set via a pin at power on of said serial communication device.

11. The serial communication device of claim 8, wherein said first set of messages includes a configuration request message and said second set of messages includes an interrupt message.

12. The serial communication device of claim 8, wherein both said first and second serial communication devices include at least one state machine having state transitions which occur as a function of device mode.

13. The serial communication device of claim 12, wherein said at least one state machine includes a SEND_SLOT_PWR state which can be reached by said serial communication device only when said serial communication device is operating in said root mode.

14. A method for communicating between serial devices comprising the steps of: configuring a first serial device (20) to operate in a root operating mode and a second serial device (22) to operate in an endpoint operating mode; transmitting a first set of messages from said first serial device (20) to said second serial device (22); and transmitting a second set of messages from said second serial device (22) to said first serial device (20).

15. The method of claim 14, wherein said first serial device (20) and said second serial device (22) have identical architectures.

16. The method of claim 14 wherein said step of configuring further comprises: setting a set of bits in a PCI Express capabilities register of said first serial device to a first value for said first serial device operating in said root mode and setting said set of bits in another PCI Express capabilities register of said second serial device to a second value for said second serial device operating in said endpoint mode.

17. The method of claim 16, wherein said set of bits in said PCI Express capabilities register is set via a pin at power on of said first and second serial devices.

18. The method of claim 14, wherein said first set of messages includes a configuration request message and said second set of messages includes an interrupt message.

19. The method of claim 14, wherein both said first and second serial devices include at least one state machine having state transitions which occur as a function of device mode.

20. The method of claim 19, wherein said at least one state machine includes a SEND_SLOT_PWR state which can be reached by said serial communication device only when said serial communication device is operating in said root mode.

* * * * *